Oct. 17, 1944.  O. NYGAARD ET AL  2,360,574
GAS GENERATOR
Filed Aug. 3, 1940  3 Sheets-Sheet 1

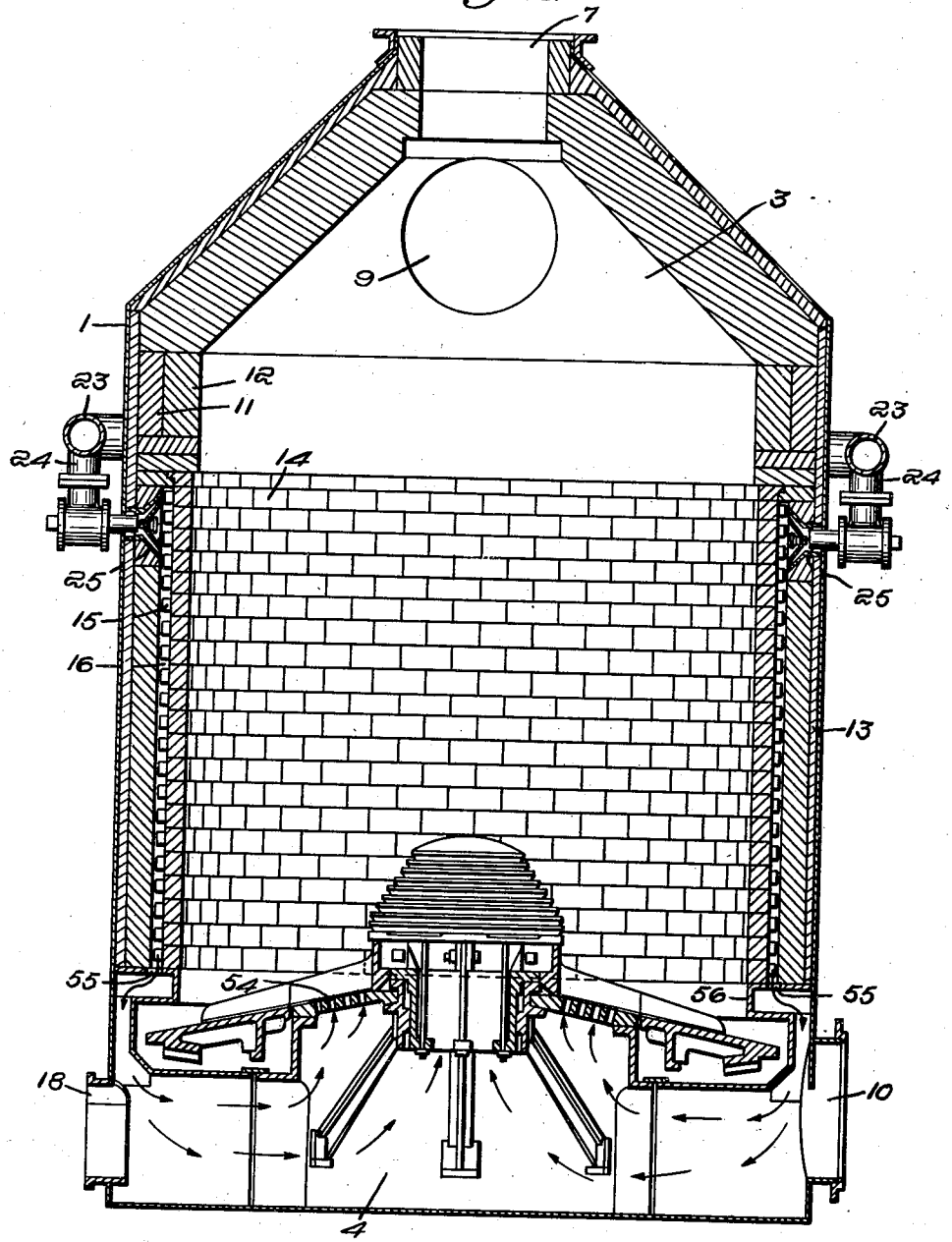

Patented Oct. 17, 1944

2,360,574

UNITED STATES PATENT OFFICE 2,360,574

GAS GENERATOR

Oscar Nygaard, Saugus, Mass., and Charles H. Schroder, Philadelphia, Pa., assignors to Bernitz Furnace Appliance Company, Boston, Mass., a corporation of Massachusetts Application August 3, 1940, Serial No. 351,024

4 Claims. (Cl. 48—78)

This invention relates to what is commonly referred to as water gas apparatus for making gas used for illuminating, cooking, and industrial purposes. Such an apparatus ordinarily consists of three vertical steel cylinders named the generator, carburetor, and superheater. As the invention is concerned with improvement of the generator only, the operation thereof, and its connections, the carburetor and superheater are not shown in the accompanying drawings, as such structures are well known to those familiar with the art.

It has been common practice for many years past to make the refractory brick lining of the generator hollow and to pass alternately steam and air through the space between the inner and outer lining brick for the purpose of cooling the lining as shown, for instance, in the patent to Nygaard et al. No. 1,790,110 and to Nygaard No. 1,964,073. While all such prior constructions have been very useful they, nevertheless, fell short of cooling the lining to the degree necessary to eliminate entirely clinker adhesion, and to insure the maximum life of the lining. Further, such cooling as was obtained could not be regulated to meet operating conditions without installing numerous extra valves that had to be separately operated and which thus slowed up the operation of the apparatus, resulting in failure to obtain maximum capacity and efficiency. Another defect in some prior constructions, other than those of the abovementioned patents, was that explosions have been known to occur within the space of the lining and the connections thereto, and although such explosions were of a minor character they were serious enough to discourage the use of the constructions involved.

It is the purpose of this invention to correct and overcome these defects in the prior constructions, and to render the operation safe and efficient by providing:

1. Adequate means for purging the space within the lining and the connections thereto of any gas that may have collected there and to operate such means in an efficient manner without loss of time and capacity;

2. To provide a cooling system capable of rendering the refractory lining completely clinker resistant, so that the downward progression of the slag and non-combustible matter in the fuel bed will not be hindered or stopped, this being necessary and essential in order to permit continuous operation of the generator with automatic self-cleaning grates. Heretofore the installation of automatic grates has progressed very slowly, although several good designs have been made and their economical advantages have been well established, due to the necessity of equipping the generator with a water jacket, which is comparatively expensive, in place of the refractory lining in order to make the uninterrupted downward movement of the slag and refuse in the fuel bed possible. The present invention provides a refractory generator lining which, so to speak, sheds the clinkers and has proved to do just that in practical installations, making possible the universal application of automatic grates and continuous efficient operation of the generator;

3. A cooling system for the lining capable of regulation at the will of the operator to suit operating conditions of the generator;

4. A cooling system for the lining under the direct control of the operator and wherein the operating means are synchronized with the other operating apparatus for the generator to eliminate loss of time and to reduce labor;

5. A cooling system connected to the air and steam supply sources for the generator in a manner to insure a positive, direct and efficient circulation through the refractory lining.

Other objects of this invention are to provide a construction that will provide maximum life of the refractory lining, and to increase the capacity of the generator and the efficiency thereof. Installations made in accordance with this invention have shown a marked saving in fuel over that obtained through the use of prior constructions.

The accompanying drawings serve to illustrate the essential parts of the invention, but it will be understood that it is possible to alter, modify, and rearrange the various details shown without departing from the spirit and scope of the invention.

In the drawings,

Fig. 4 is a vertical cross-sectional view taken through the center of a generator equipped with an automatic self-cleaning grate.

Figure 1:
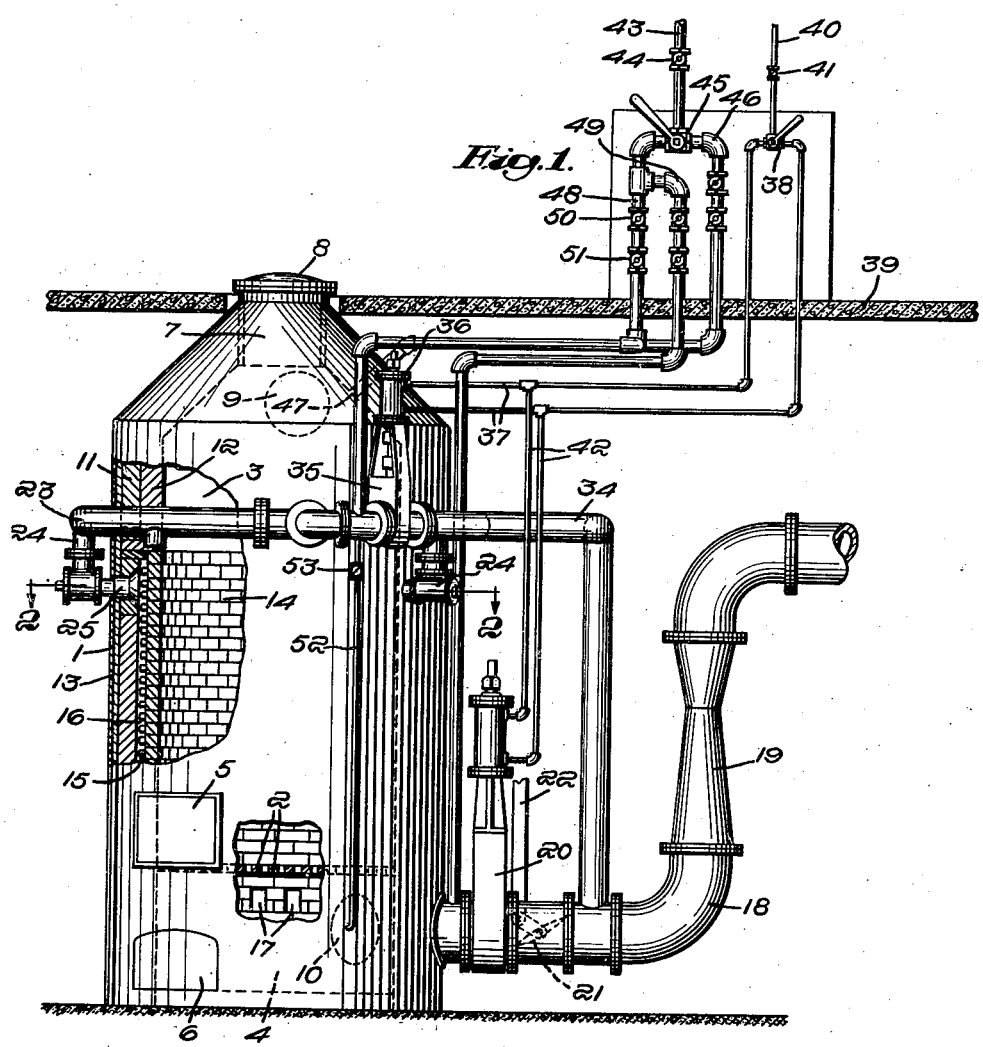
Fig. 1 illustrates a common type of water gas generator and typical connections thereto made in accordance with this invention, with the cylindrical shell and refractory lining of the generator cut away at two places to show, respectively, the interior construction of the lining and the location of the fuel supporting grate.
Figure 2:
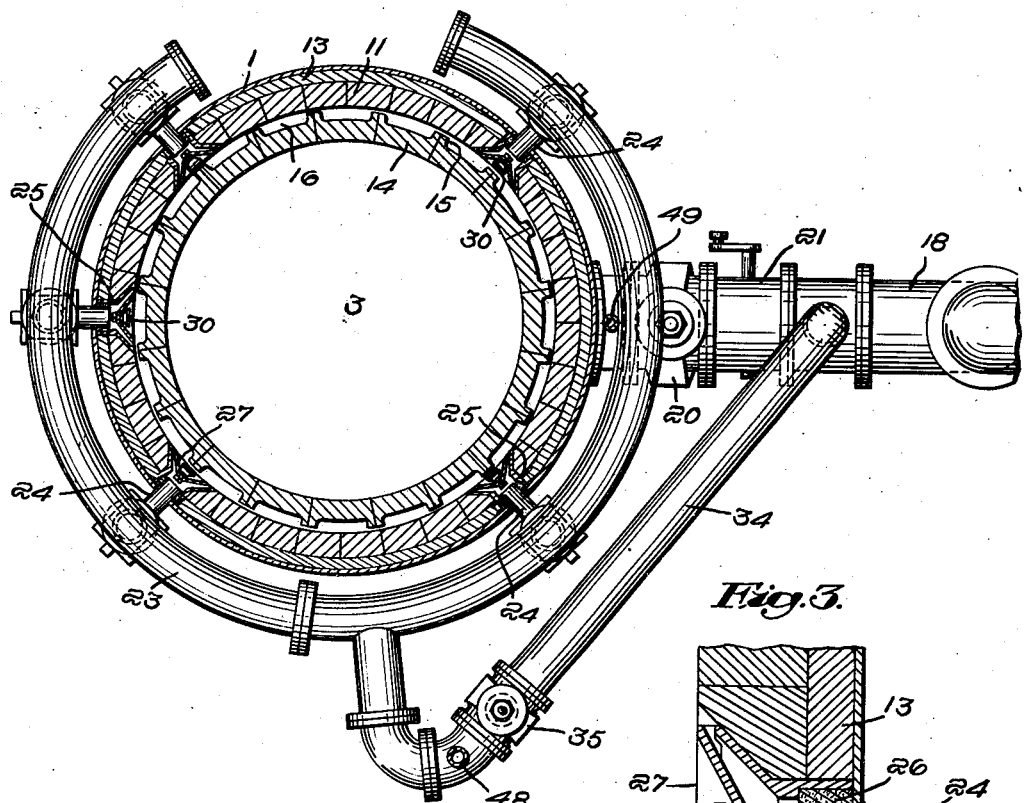
Fig. 2 is a sectional view taken on line 2—2 of Fig. 1 with a plan view of the connecting pipes.

Like parts have been numbered alike in all the drawings. 1 is the steel shell of a typical generator fitted with grate bars 2 dividing the generator into the fuel combustion space 3 and the ash pit 4. Clinkering door 5 provides access to the combustion space above the grate bars and a door 6 opens into the ash pit below the same. In the top of the generator is a fuel-charging opening 7, shown in dotted outline in Fig. 1 and in full in Fig. 4, on top of which is located a removable cover 8. Dotted openings 9 and 10 are for drawing off the gas at the top and bottom of the generator respectively.

The generator lining of refractory brick usually comprises an outer portion 11 which is built separate from the inner portion 12. To protect further the steel shell 1 from the heat of the fire, insulation material 13 is applied.

Above the normal height of the fuel bed the inner lining brick are commonly of first-quality clay material and the lining is built solid; while below the normal height of the fuel bed, the inner lining brick 14 are made of a much higher heat-resistant and heat-conducting material, such as silicon carbide, and this section is made thinner and is fitted with spacing lugs 15 to provide an annular space 16 which terminates below the grate bars 2 in a multiplicity of openings 17, only two of which are shown in the drawings, Fig. 1.

Entering the interior of the generator at the ash pit is the main air blast pipe 18 connected at the other end to a blower, not shown. The pipe 18 is equipped with a metering nozzle 19, a blast valve or shut-off valve 20, and a butterfly valve 21 fitted with a lever 22 for manual operation.

Figure 3:
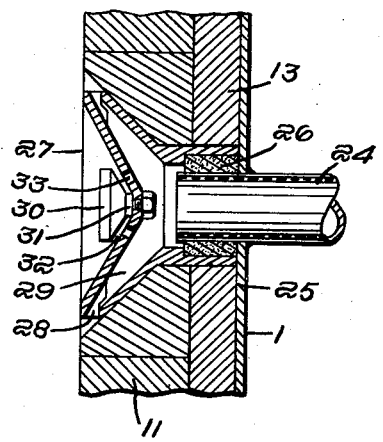
Fig. 3 is a vertical cross-sectional view on a larger scale of one of the several diffusion heads fitted on the ends of the pipes passing through the generator shell.

Substantially surrounding the generator shell is a manifold pipe 23 having several pipe outlets 24 which project through the steel shell at spaced intervals. Over the end of the outlet pipes 24 is fitted a cylindrical and flared baffle device or diffusion head 25, best shown in Fig. 3, having a recess at the outer end to receive packing material 26 to insure tightness around pipes 24. To the inner end of casting 25 is welded or otherwise fastened a cone-shaped casting 27 equipped with spacing lugs 28 by which a space or passage 29 is obtained. Another smaller cone-shaped casting 30 is fastened to the inner side of the casting 27, casting 30 having a shoulder portion 31 which acts as a spacer between the two cones to form passage 32, communication between the two passages 29 and 32 is provided through several holes 33 in cone 27. By means of this arrangement the cooling fluid coming from the manifold pipe 23 through the outlet pipes 24 will be diffused both laterally and vertically and thus obviate direct impingement on the inner lining brick 14.

The manifold 23 is connected to the main air blast pipe 18 by branch pipe line 34. In the drawings both the main blast valve 20 and the butterfly valve 21 are shown positioned between the generator and the branch line 34. The main blast valve could just as well be located on the blower side of the branch line 34, but it is essential that the butterfly valve 21, or the equivalent of such valve, be positioned between the generator and the connecting point of the branch line 34 to the main blast pipe.

The valve 21 serves the important function of regulating and proportioning the amount of air that is to pass directly to the ash pit of the generator, and the amount to be passed through the manifold 23, the annular space 16, and thence to the ash pit. Partially closing the valve 21 will allow less air to enter the ash pit directly, consequently reducing the pressure at that point and correspondingly building up the pressure in the branch line 34. Thus air under a higher pressure will be available for overcoming frictional losses in its flow through the piping system and the refractory lining to the ash pit, and a positive circulation of cooling air will be maintained.

The branch line 34 has a blast valve 35 fitted for hydraulic operation by the cylinder 36 and connecting pressure pipes 37, which terminate at a three-way control valve 38 located above the operating floor 39 and connected to the supply pipe 40 having stop valve 41.

The blast valve 20 is similarly hydraulically operated, and it will be noted that pressure pipes 42 are connected to the pipes 37. By this arrangement blast valves 20 and 35 will be controllable from one point and operated in unison, thereby saving valuable operating time.

Steam used for making gas is supplied through pipe 43, stop valve 44, and three-way valve 45. From this three-way valve control point, steam for the downrun is taken through the pipe 46 which enters the interior of the generator through the roof or crown thereof at 47. The steam used during the uprun splits two ways through pipe lines 48 and 49, the former entering the branch line 34 for circulation through the refractory generator lining before reaching the ash pit, and the latter being connected to the main blast pipe on the generator side of the blast valve for direct admission to the ash pit.

Each of the steam pipes 46, 48 and 49 is equipped with a stop valve 50 and a valve 51 adapted to be set at intervals to admit the proper amount of steam to the various inlets for efficient operation. The pipe lines 48 and 49 being of ample size, it will be understood that all of the uprun steam can be supplied through either of these lines separately, if desired, by closing the stop valve in one of the lines. This feature is important in that it affords a means for keeping the generator in operation in the event that the cooling system for the generator lining should become inoperative because of a worn out refractory lining or from other causes. It will also be observed that, like the air supply, all the uprun steam has a one point control to save operating time.

It will be noted also that the uprun steam pipe 48 is connected to the branch line 34 adjacent the blast valve 35 on the generator side of the valve. This connection makes it possible to purge completely the annular space within the refractory lining and the manifold connections all the way back to the blast valve 35 from any gas that might have collected therein during the downrun and thus eliminate any danger of explosion when the blast air is again turned on.

It should be observed that the provision here made for dividing the flow of air of combustion between the ash pit and the manifold 23 and varying the relative volumes of air delivered to these two parts, and similarly controlling the proportions of the total volume of steam required for the up-run between the manifold and the ash pit, makes it possible to preheat a large proportion of the air used in the blast and a high proportion, also, of the steam used in the up-run so that an over-all increase in efficiency of the generator is realized. In addition, this same ability to divide the flow of air and steam in the manner just described enables the operator to control the temperature of the lining to a degree that has not been possible heretofore. This is an extremely important practical advantage for the reason that if the lining becomes too hot, ash and slag will cling to it and build up on it. When it is broken off it is very likely to carry portions of the lining with it. So long as such accumulations remain adhering to the lining, they prevent the downward movement of the ash along the inner surface of the lining to the grate, and thus reduce the efficiency of the unit. This is a particularly troublesome condition when an automatic self-cleaning grate is used because the action of that grate in cleaning itself depends upon the ash settling down to it fairly uniformly. One of the advantages of a self-cleaning grate is that it permits a substantially continuous operation of the generator and that advantage cannot be fully realized if it is necessary to shut the generator down to remove accumulations of slag and clinker.

A drain pipe 52 with valve 53 is connected to the branch line 34 below the uprun steam connection thereto, the other end of this drain pipe, shown entering the interior of the generator at the ash pit, can be located at any other convenient place. This drain is not an essential part of the cooling system, but may be used to avoid condensate collecting in the manifold connections.

In Fig. 4 is shown a generator equipped with an automatic self-cleaning grate 54, the construction of the refractory lining and cooling system in connection with the generator being identical with that shown in connection with the stationary grate bars 2 of Fig. 1 with the exception that the outlets from the annular space 16 in the refractory lining to the ash pit 4 are made through holes 55 in the top of an annular manifold 56 which surrounds the automatic grate and supports the brick lining. While only one type of automatic grate is shown in the drawings, it will be understood that the refractory lining and cooling system therefor can be used to equal advantage in connection with any type of automatic grate as the outlet connections from the annular space to the ash pit can be made in any convenient manner to suit the particular construction of the grate.

From the foregoing description of our invention those skilled in the art will understand how the operation thereof is accomplished. Hence, further elucidation is thought to be superfluous.

Having thus described our invention, what we claim as new and desire to secure by Letters Patent is:

1. A water gas generator comprising the combination with a generator casing, a fire grate therein for supporting a fuel bed and dividing the space in said casing into an ash pit below the grate and a combustion chamber above it, said combustion chamber including a non-perforated refractory wall of high heat conductivity, a second wall surrounding said combustion chamber and cooperating with said wall of said combustion chamber to provide an annular internal space between said walls, separated from but surrounding said combustion chamber and extending from about the region of the grate to about the normal upper level of the fuel bed, said annular space communicating with the space below the grate; of an air blast pipe for delivering air into said ash pit, a manifold surrounding the greater part of the upper portion of said combustion chamber, a branch pipe for conducting air from said blast pipe to said manifold, means adjustable to vary the distribution of said air between said manifold and said ash pit, respectively, means operated from a single control point to turn the air on to said manifold and said ash pit simultaneously and to shut it off simultaneously from both said manifold and the ash pit, a steam supply system including distributing pipes for conducting steam for the up-run to both said manifold and said ash pit and for conducting steam for the down-run to a point in said combustion chamber above the fuel bed, said system including a valve constructed to control selectively the flow of steam through said distributing pipes to feed it to said manifold and ash pit during the up-run and to said point above the fuel bed during the down-run, and connections for conducting the air and steam delivered to said manifold into the upper end portion of said annular space in said wall where they are both compelled to flow downwardly through said space into said ash pit so that the air will be preheated during the blast and the steam will be preheated during the up-run, baffle means disposed between said last mentioned connections and said non-perforated refractory wall of the combustion chamber, and regulating valves in certain of said distributing pipes adjustable to proportion the flow of steam between said manifold and said ash pit to control the temperature of said lining.

2. A water gas generator equipped with an automatic self-cleaning fire grate, comprising a circular wall surrounding said grate and forming the boundary of an ash pit below the grate and a combustion chamber above said grate, said wall including an inner lining of non-perforated silicon carbide bricks of high heat conductive capacity cooperating with outer wall parts to provide within said wall structure an internal annular space extending from the region of the grate level to about the normal upper level of the fuel bed supported on said grate, said annular space communicating with the space below the grate, a manifold surrounding the greater part of the upper portion of said combustion chamber, means for delivering air for combustion to both said ash pit and said manifold, connections for conducting air from said manifold to the upper end portion of said annular space at a series of points therearound so that such air will flow down through said space into the ash pit and become preheated in doing so, baffle means disposed between said last mentioned connections and said refractory inner lining of the combustion chamber, control valves for said air, means for operating them simultaneously to shut off the flow of air from both the ash pit and the manifold simultaneously and to turn said air on again simultaneously to both the ash pit and the manifold, a system for supplying steam to said manifold and ash pit and to the crown portion of the generator above the fuel bed, said system including a valve operable to feed steam alternately for the up-run and the down-run and additional valves adjustable to divide the steam flow between said manifold and said ash pit during the up-run as required to control the temperature of said lining, and means adjustable to divide the flow of air of combustion to said manifold and said ash pit as necessary to assist in effecting said control of the temperature of the lining.

3. A water gas generator comprising the combination with a generator casing, a fire grate therein for supporting a fuel bed and dividing the space in said casing into an ash pit below the grate and a combustion chamber above it, said combustion chamber including a refractory wall of high heat conductivity, a second wall surrounding said combustion chamber and cooperating with said wall of said combustion chamber to provide an annular internal space between said walls surrounding said combustion chamber and extending approximately from the level of the grate to the normal upper level of the fuel bed, said annular internal space communicating with the space below the grate, of inlets disposed in the second named wall and communicating with the said annular internal space, and means for delivering air and steam under pressure to said ash pit and to the said inlets, said means including valves for controlling the flow of air and steam to said ash pit and to said inlets and also including baffle means disposed between the said inlets and the refractory wall of the combustion chamber.

4. A water gas generator comprising the combination with a generator casing, a fire grate therein for supporting a fuel bed and dividing the space in said casing into an ash pit below the grate and a combustion chamber above it, said combustion chamber including a refractory wall of high heat conductivity, a second wall surrounding said combustion chamber and cooperating with said wall of said combustion chamber to provide an annular internal space between said walls surrounding said combustion chamber and extending approximately from the level of the grate to the normal upper level of the fuel bed, said annular internal space communicating with the space below the grate, and means for delivering gaseous fluid under pressure to said annular space, said means including a series of diffusion heads positioned in the second named wall and through which said fluid is discharged into said space, each of said heads comprising a hollow fluid conducting member tapered both vertically and laterally and having fluid discharging passages at the edges thereof but baffled between said edges so that the fluid is dispersed throughout a relatively large area of said annular space before striking the lining.

CHARLES H. SCHRODER.
OSCAR NYGAARD.